United States Patent [19]

West

[11] Patent Number: 5,772,215
[45] Date of Patent: Jun. 30, 1998

[54] HEAD GASKET WITH IMPROVED ARMORING AND METHOD OF MAKING SAME

[75] Inventor: Gregory C. West, Kenosha, Wis.

[73] Assignee: Fel-Pro Incorporated, Skokie, Ill.

[21] Appl. No.: 569,968

[22] Filed: Dec. 8, 1995

[51] Int. Cl.$^6$ ........................................ F16J 15/12
[52] U.S. Cl. .......................................... 277/235 B
[58] Field of Search ................................ 277/234, 235 B

[56] References Cited

U.S. PATENT DOCUMENTS

| | | | |
|---|---|---|---|
| 1,793,423 | 2/1931 | Fitzgerald | 277/235 B |
| 1,815,601 | 7/1931 | Victor | 277/235 B |
| 1,815,602 | 7/1931 | Russell | 277/235 B |
| 1,819,694 | 8/1931 | Sperry | 277/235 B |
| 1,823,341 | 9/1931 | Victor | 277/235 B |
| 1,823,342 | 9/1931 | Victor | 277/235 B |
| 1,846,402 | 2/1932 | Oven | 277/235 B |
| 1,864,854 | 6/1932 | Oven | 277/235 B |
| 1,903,990 | 4/1933 | Fitzgerald | 277/235 B |
| 1,928,116 | 9/1933 | Stephens | 277/235 B |
| 2,074,388 | 3/1937 | Gordon | 277/235 B |
| 3,549,157 | 12/1970 | VonBennigsen | 277/235 B |
| 3,738,558 | 6/1973 | Colwell | 277/235 B |
| 3,784,212 | 1/1974 | Doerfling | 277/235 B |
| 4,465,287 | 8/1984 | Bindel et al. | 277/235 B |
| 5,306,023 | 4/1994 | Udagawa | 277/235 B |
| 5,586,769 | 12/1996 | Novil et al. | 277/235 B |

*Primary Examiner*—Scott Cummings
*Attorney, Agent, or Firm*—Brinks Hofer Gilson & Lione

[57] ABSTRACT

A head gasket having a pair of armor assemblies with protective shim portions in the zones of adjacency of adjacent pairs of combustion openings. One armor's shim portions face one main surface of a main body of the gasket and the other armor's shim portions face the other main surface of the main body. The associated armors and the shims comprising the armor assemblies encapsulate the zone of adjacency and protect against degradation of that zone and enhance sealing thereat. A method of making the head gasket by applying the armor assemblies from opposite sides of the main body is also disclosed.

9 Claims, 4 Drawing Sheets

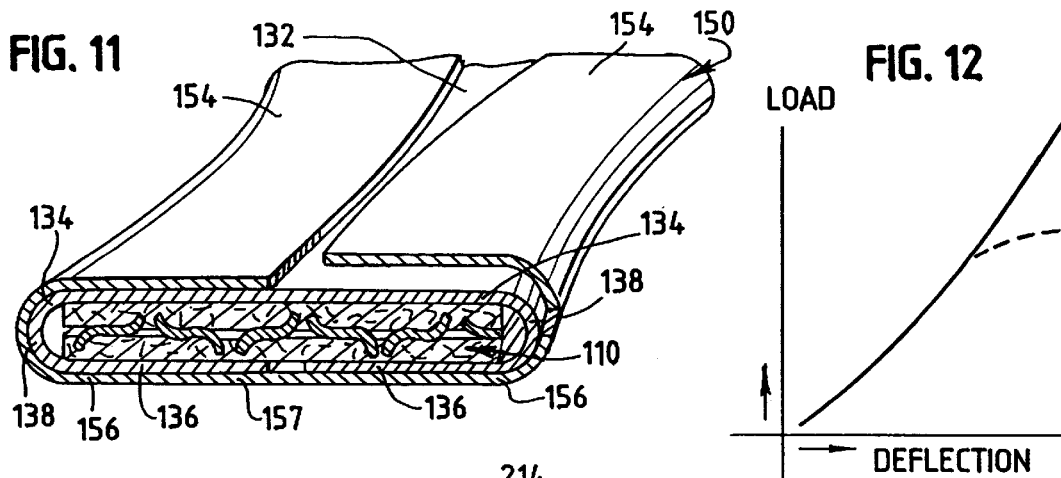
FIG. 11
FIG. 12
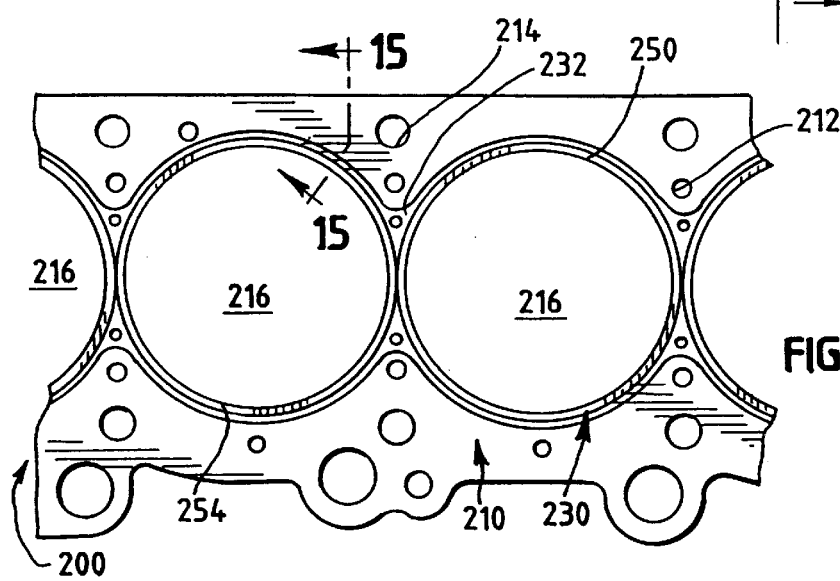
FIG. 13
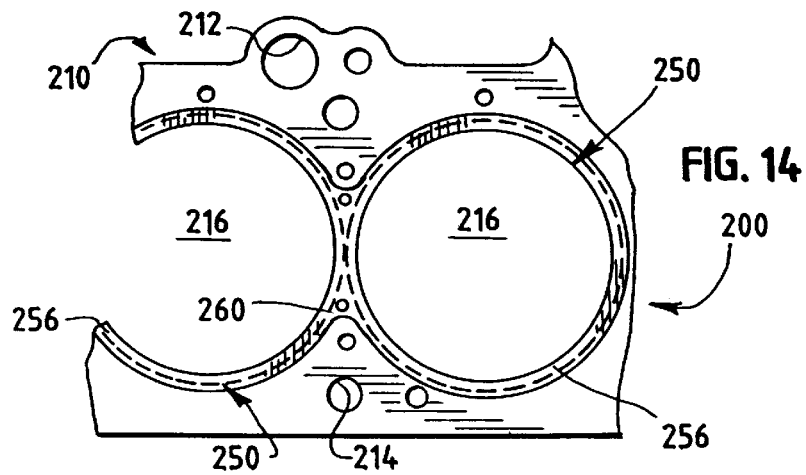
FIG. 14
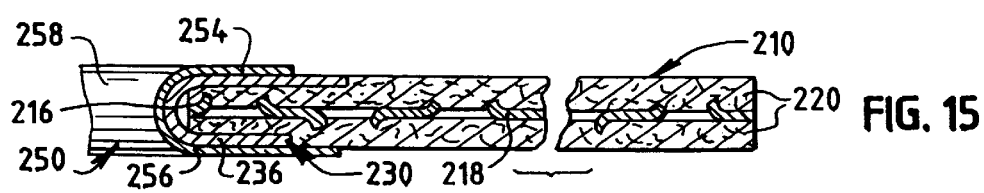
FIG. 15

HEAD GASKET WITH IMPROVED ARMORING AND METHOD OF MAKING SAME

BACKGROUND OF THE INVENTION

Cylinder head gaskets made with layers of facing material have been manufactured and used for decades. Such gaskets usually employ fire rings, such as U-shaped armors with or without wires, at the combustion openings to embrace the peripheral edges defining the combustion openings, thereby to protect the edges and enhance the sealing effect thereat.

Sometimes the armors have been integrated so that the armors for pairs of adjacent or adjoining combustion openings comprise a unitary assembly. In some instances one entire surface of the gasket is covered with the sheet material from which the armors are formed.

The presence of integrating material at the zones of adjacency of pairs of combustion openings enhances the seal thereat, particularly where the combustion openings are very close to each other and the facing material is therefore weakened and fragile.

Various sealing adjuncts have been provided for use at conventionally armored combustion openings and especially for use in the zones of adjacency of pairs of such openings. Thus, for example, multiple armors have been employed, with a second U-shaped armor simply overlying a first U-shaped armor. This, of course, enhances the seal to be effected thereat. In other instances metal shims have been placed under a leg of the U-shaped armor to provide for greater sealing stress. In some such cases, the shims for adjacent combustion openings are formed with, hence integrated with the armors in the zone of adjacency of a pair of combustion openings, thereby to enhance the sealing effect and to protect the facing layer or layers thereat.

While all of these armoring techniques and adjuncts are of advantage, none is ideal. All of them tend to be sensitive to the conditions and loads at the combustion openings, such as excessive loads due to thermal push, and tend to permit extrusion of facing layers when the gasket is exposed to excessive clamp loads, such as because of thermal push. This tendency is most severe in the zones of adjacency of pairs of adjacent combustion openings.

It would be of advantage to provide improved armoring and a method of making a gasket providing such improved armoring.

SUMMARY OF THE INVENTION

In accordance with the present invention, a head gasket having improved armoring is provided, together with a method of making such a gasket. To that end an improved head gasket comprises a main gasket body having at least one facing layer and defining a plurality of apertures, including at least one pair of adjacent combustion openings, and having first and second main surfaces, a first armor assembly comprising armors and having a joining shim portion covering the zone of adjacency of the pair of adjacent combustion openings on one of the main surfaces, each armor embracing the peripheral edge of a combustion opening and having a first leg formed with the joining shim portion and having a second leg confronting the other of the main surfaces, a second armor assembly comprising armors and having a joining shim portion covering the zone of adjacency of the pair of adjacent combustion openings on the other of the main surfaces, each armor embracing the peripheral edge of a combustion opening and having a first leg confronting the one of the main surfaces, whereby the zone of adjacency is encapsulated and resists degradation due to thermal push.

The second armor assembly may have a main body portion that overlies an entire main surface and defines the second armor assembly joining shim portion. The first armor first leg may desirably project radially outwardly beyond the second armor first leg. In a preferred form the main gasket body includes a central core and a pair of facing layers, one on each surface of the central core. The facing layers may be compressed expanded graphite.

Desirably the armors are U-shaped armors, each having a nose portion formed with legs confronting the main surfaces of the main gasket body. In a preferred form each armor of the second armor assembly has a second leg confronting the other of the main surfaces, and the second armor second leg projects radially outwardly beyond the first armor second leg, and the first armor first leg projects radially outwardly beyond the second armor first leg.

In accordance with the present invention, a method of making an armored head gasket having at least one pair of adjacent combustion openings and improved sealing characteristics in the zone of adjacency of each pair of adjacent combustion openings is provided. It comprises the steps of providing a main gasket body defining a plurality of service openings and bolt holes, at least one pair of adjacent combustion openings, a pair of main surfaces, and having at least one facing layer, providing a first integrated inner armor assembly for embracing the peripheral edges of the pair of combustion openings, the inner armor assembly comprising a shim for overlying the gasket body in the zone of adjacency and an adjoining pair of armors, forming the armor assembly to embrace the peripheral edges of the combustion openings and to position the shims against one main surface of the gasket, providing a second integrated outer armor assembly for embracing the peripheral edges of the pair of combustion openings, the outer armor assembly comprising a second shim for underlying the gasket body in the zone of adjacency and an adjoining pair of armors, and forming the second armor assembly to embrace the peripheral edges of the combustion openings and to position the second shims against the other main surface of the gasket, whereby each main surface of the main gasket body in the zone of adjacency of the pair of combustion openings is sealed by a shim, and the zones of adjacency between the adjacent pairs of combustion openings are encapsulated and resist degradation due to local operating conditions in an engine.

In one form of the method, the second armor assembly has a main body portion that underlies the entire gasket body. In a preferred form the gasket body comprises a central core and a pair of facing layers, one on each main surface of the gasket body, and the facing layers are desirably of compressed expanded graphite.

Further objects, features and advantages of the present invention will become apparent from the following description and drawings.

BRIEF DESCRIPTION OF THE DRAWINGS

FIG. 11 is a schematic perspective view taken from a perspective similar to that of FIG. 9;

FIG. 12 is a load deflection curve showing how an armored head gasket of the type shown in FIG. 7 differs from that of a prior art head gasket of the type represented by FIG. 1;

FIG. 13 is a fragmentary top plan view of a further armored head gasket of the present invention;

FIG. 14 is a fragmentary bottom plan view of the armored head gasket of FIG. 13;

FIG. 15 is a cross-sectional view taken substantially along line 15—15 of FIG. 13;

DETAILED DESCRIPTION

Figure 1:
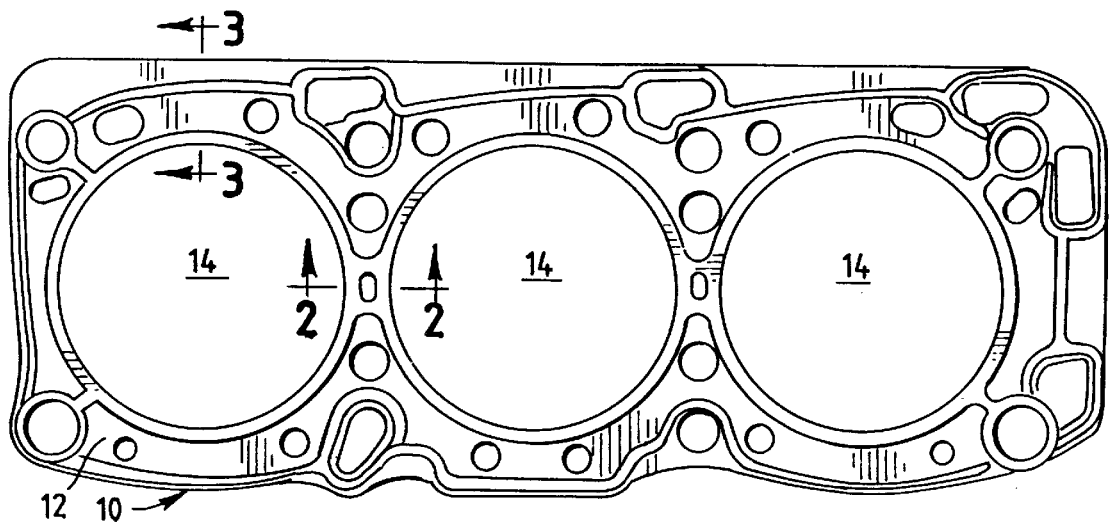
FIG. 1 is a plan view of a prior art armored head gasket.
Figure 2:
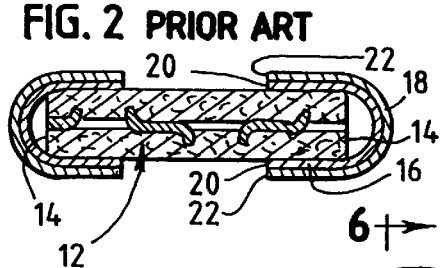
FIGS. 2 and 3 are cross-sectional views taken substantially along lines 2—2 and 3—3, respectively, of the prior art armored gasket of FIG. 1.
Figure 3:
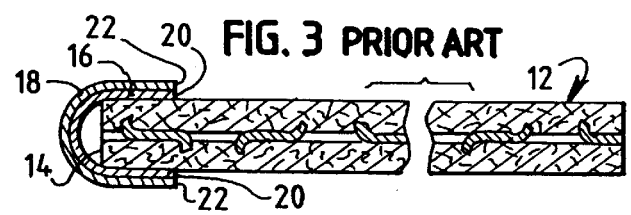

Referring first to the exemplary prior art armored head gasket shown in FIGS. 1–3, head gasket 10 comprises a main body 12 including a tanged core to which compressed expanded graphite facings are secured. The main gasket body 12 defines a plurality of apertures or openings, including conventional oil and water holes and bolt holes. Various sealing adjuncts such as printed seals, protective coatings, etc. (not shown) may be provided as well. Gasket 10 also defines plural combustion openings 14, each of which is armored in accordance with a prior art practice.

As seen in FIGS. 2 and 3, each combustion opening 14 is provided with a pair of inner and outer armors 16, 18, respectively, each of which is generally U-shaped (sometimes referred to as C-shaped), and each of which embraces the peripheral edge of a combustion opening 14. The respective outer edges 20, 22 of the armors 16, 18 are typically in vertical alignment. In this prior art embodiment as shown in FIG. 1 the armors are connected in the zones of adjacency of pairs of combustion openings 14, but they do not cover, seal or effectively protect the zone of adjacency. Similarly, armors 18 are formed in a unitary assembly with connections in the zone of adjacency, but do not seal, cover or effectively protect the zone of adjacency. The armors 16, 18 simply provide enhanced sealing in the areas in which they are located, namely around the peripheral edges of the combustion openings 14.

Figure 4:
FIG. 4 is a plan view of a further prior art armored head gasket.
Figure 5:
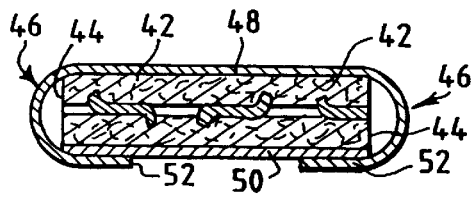
FIGS. 5 and 6 are cross-sectional views taken substantially along lines 5—5 and 6—6, respectively, of the prior art armored gasket of FIG. 4.
Figure 6:
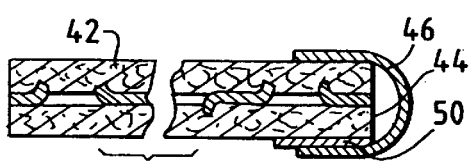

Referring now to another prior art armored head gasket, FIGS. 4–6 show a head gasket 40 comprising a main body 42 including a tanged core and facing layers, generally like body 12. Main body 42 defines a plurality of conventional openings, may employ conventional sealing adjuncts, and defines plural combustion openings 44, only one pair of which is illustrated. The combustion openings are armored in accordance with yet another prior art practice.

As seen in FIGS. 5 and 6, each of the pair of adjacent combustion openings 44 is provided with an armor 46 which armors are formed with a protective shim portion 48 in the zone of adjacency of combustion openings 44. Protective shim portion 48 overlies one major surface of the gasket body and protects the facing material in the zone of adjacency. This is best seen from FIG. 5. Additionally, a shim 50 for protecting the other side of the gasket in the same zone of adjacency is provided. Shim 50 desirably comprises an assembly of integrated sections, each section surrounding a combustion opening 44, and which sections are captured and retained by the integrated armors 46, all as is apparent from FIGS. 5 and 6. However, under load, if the legs 52 of armors 46 tend to spread under excessive loading, the main body 42 of the gasket 40 will be exposed to gases and will tend to degrade.

Figure 7:
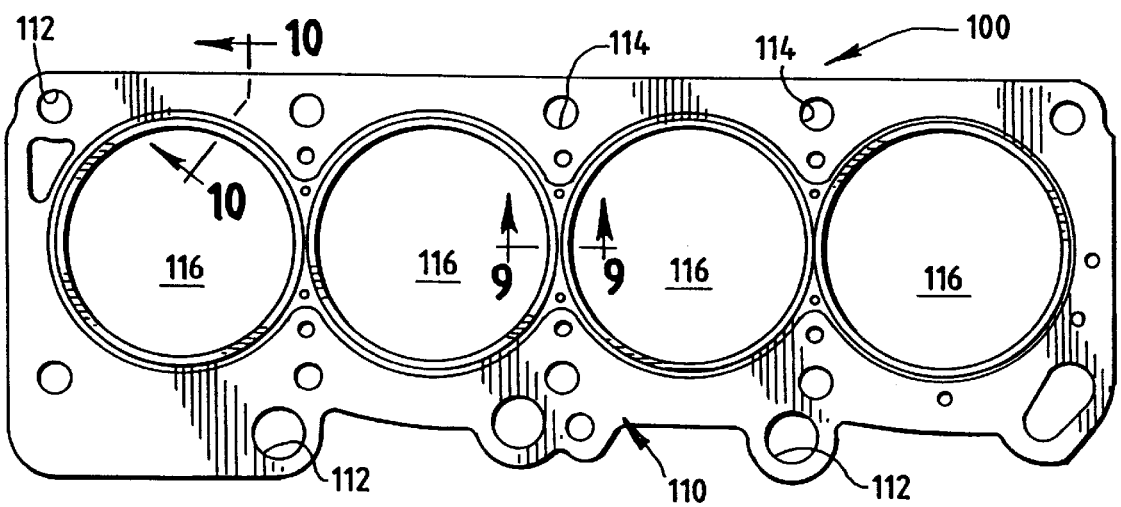
FIG. 7 is a top plan view of an armored head gasket of the present invention.
Figure 8:
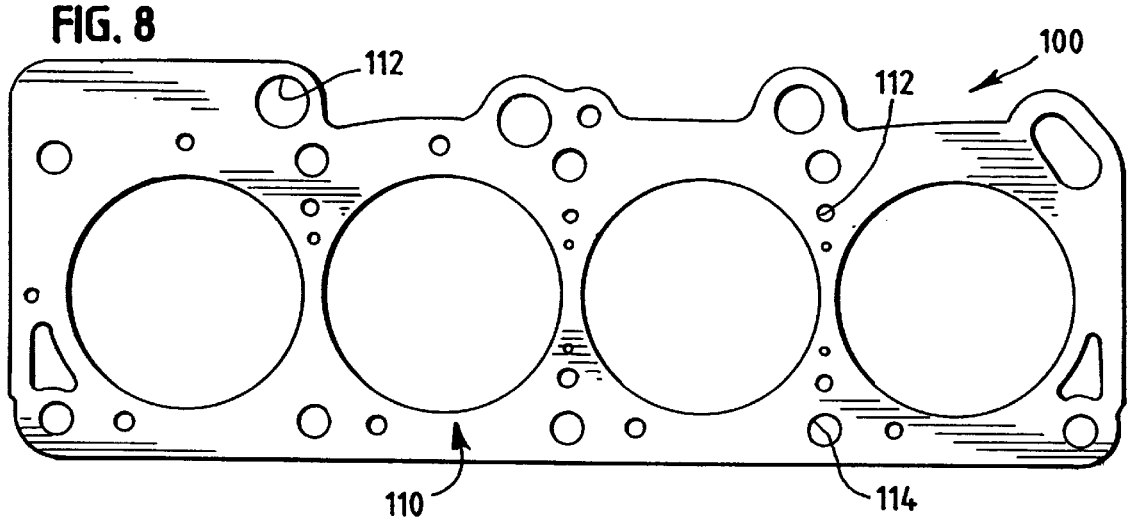
FIG. 8 is a bottom plan view of the armored head gasket of FIG. 7.

Referring now to FIGS. 7–11, an armored head gasket in accordance with the present invention comprises a head gasket 100 having a main gasket body 110. Gasket body 110 defines a plurality of apertures such as suitable water and oil holes 112, bolt holes 114 and combustion openings 116. The main gasket body 110 has two main or major surfaces as seen in FIGS. 7 and 8. Body 110 includes a central tanged core 118 to which facing layers 120 of compressed expanded graphite are secured.

Figure 9:
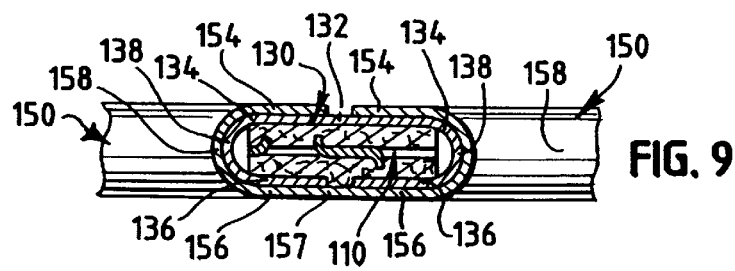
FIGS. 9 and 10 are cross-sectional views taken substantially along lines 9—9 and 10—10, respectively, of FIG. 7.
Figure 10:
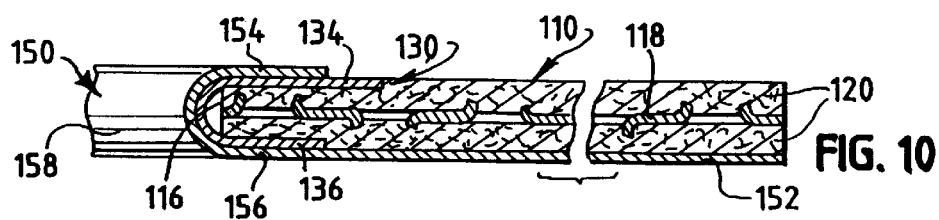

The head gasket further comprises a first inner armor 130 for each combustion opening 116. Inner armors 130 are integrated into a unitary assembly. Each adjacent pair of inner armors 130 is connected in the zone of adjacency of a pair of combustion openings by a shim or connector 132. Each armor 130 is generally U-shaped in cross-section and has a pair of upper and lower legs, upper leg 134 and lower leg 136, respectively, and a nose 138 connecting the legs and enclosing the adjacent peripheral edge of the associated combustion opening 116. As will be apparent, the assembly of armors 130 is assembled with the main gasket body 110 as a group. Typically, the lower legs 136 are initially formed to project vertically downwardly into the combustion openings, following which the lower legs are formed outwardly to lie against the lower major surface of the main body, as shown by FIGS. 9–11.

The second outer armors 150 are, in this case, integrated with a metallic sheet 152 which confronts and overlies the entire surface of the lower graphite facing layer 120 defining the lower surface of the main body 110. Armors 150 include upper leg portions 154 as well as lower legs 156 which are continuous with the main body of sheet 152, and nose portions 158. The sheet 152 also provides a shim section 157 in the zone of adjacency of each pair of adjacent combustion openings (see FIGS. 9 and 11). As is apparent from FIG. 10, in a preferred form the inner armor first leg 134 projects radially outwardly beyond the second armor first leg 154.

The armors 150 embrace the peripheral edges of the combustion openings 116 as well as the first armor 130. For assembly purposes they are initially formed at an angle which is generally perpendicular to the main body 110 for association therewith. The armors 150 are inserted from the lower side (opposite to the upper side and direction from which the integrated first armors 130 were installed) until the sheet 152 lies against the lower surface of the main body 110. At that time, the legs 154 are clinched or formed outwardly to embrace the peripheral edges of the combustion openings, thereby to assume the relationship shown in FIGS. 9–11.

It will be seen that at the zones of adjacency of pairs of combustion openings 116, the main body 110 is encapsulated and protected against the adverse effects of combustion, such as against the effects of thermal push and of thermal expansion of the head and block at the locations at which those effects tend to be most pronounced and aggravated. Thus, at the lower surface, as seen in FIG. 9, the main body 110 is protected against damage and against degradation due to the spreading of armor legs 136 (which is the tendency of prior art gaskets such as those shown by FIG. 2) by the presence of the shim sections 157 of sheet 152 at the zones of adjacency.

Similarly, the tendency to spread and to degrade is also resisted at the upper surface of the gasket where the inner armors 130 and armor shim 132 ensheath and protect the main body 110. That is to be contrasted with prior art structures, as illustrated by FIGS. 5 and 6, where spreading of the armor legs will allow gases to enter and gain access to the main body 42 of the gasket at the peripheral edges of the combustion openings 44.

The sealing characteristics are thus improved in the zones of adjacency of pairs of combustion openings. The relatively fragile gasket body at that zone is encapsulated. Exposure to forces tending to degrade the body is limited. The density of the facing layers is also increased thereat and around the combustion openings by the armor construction, thereby improving the overall sealing characteristics around the combustion openings.

FIGS. 12 shows how the armored head gasket of FIGS. 7–11 functions as compared to prior art gaskets of the type illustrated by FIGS. 1–3. In FIG. 12, the solid line load deflection curve is representative of the operation of a gasket which has encapsulated zones of adjacency as illustrated by the gasket of FIGS. 7–11. At a point, as illustrated by FIG. 12, prior art armored gaskets of the types represented by FIGS. 1–6 which are subjected to high loading will tend to follow the dotted line portion of the curve of FIG. 12. A failure to seal adequately will result.

A preferred gasket 100 comprises a main gasket body formed of a cold rolled steel tanged core about 0.0083 inch thick and compressed expanded graphite layers about 0.035 inch thick. The inner armor 130 may be of a tempered steel and of a thickness of 0.0091 to 0.0104 inch, while the outer armor 150 may be of a tempered steel and of a thickness of about 0.0066 to 0.0076 inch. In FIG. 10, the first inner leg 134 or heel, from the nose, is about 0.165 to 0.185 inch, and the second armor first outer leg 154 or overlap is about 0.115 to 0.135 inch. The second leg heel and overlap 254 of the first armor 230 and the second leg heel and overlap 256 of the second armor in FIG. 15 may be of similar dimensions. Other thicknesses and dimensions may be used as well. Additionally, other materials may also be used. For example, typical fiber-elastomer facing layers may be used instead of compressed expanded graphite and the main body may be laminated with a smooth, rather than a tanged, core in accordance with well known, art recognized principles. The gasket may be coated with materials having lubricating and sealing characteristics, such as polytetrafluorethylene.

A compressed expanded graphite which may be used is UCAR's Grafoil or Polycarbon's Calgraph A having a carbon content of about 93.5% and an ash content of 6.5%.

Referring now to the embodiment of the present invention shown in FIGS. 13–15, the gasket may be very similar to that of FIGS. 7–11. One notable difference is that the lower surface of the gasket as shown in FIG. 14, rather than being a continuous sheet providing the outer armors, is instead an assembly of armors similar to that of the inner armors of FIGS. 7–11.

Head gasket 200 as shown in FIGS. 13–15 has a main gasket body 210. Gasket body 210 defines a plurality of suitable water and oil holes 212, bolt holes 214 and combustion openings 216. The main gasket body 210 has two main or major surfaces. Body 210 includes a central tanged core 218 to which facing layers 220 of compressed expanded graphite are secured.

Head gasket 200 further comprises a first armor 230 for each combustion opening 216. Armors 230 are integrated into a unitary assembly which may be identical to the armor assembly made up of armors 130.

The second armors 250 are integrated and each include an upper leg 254, a lower leg 256, and a nose portion 258. In the zones of adjacency of pairs of adjacent combustion openings, the integrated armors define a shim 260. FIG. 15 shows a cross-section taken on line 15—15 of FIG. 13. A cross-section at the zone of adjacency is identical to that shown in FIG. 9. In this embodiment it is seen that the second or lower leg 256 of the second armor preferably extends radially outwardly beyond the second leg 236 of the first armor 230 to provide enhanced sealing.

Here again, the armors 250 embrace the peripheral edges of the combustion openings 216 and the first armor 230, and are initially formed at an angle which is generally perpendicular to the main body 210 for association therewith. The armors 250 are inserted from the lower side (opposite to the upper side from which the integrated first armors 130 were installed) until legs 256 and shims 260 lie against the lower surface of the main body 210. At that time, the legs 254 are clinched or formed outwardly to embrace the peripheral edges of the combustion openings 216, to assume the relationship shown in FIGS. 13–15.

It will be seen that at the zones of adjacency of pairs of combustion openings the main body 210 is encapsulated and protected against the adverse effects of combustion, such as due to thermal push and of thermal expansion of the head and block where those effects tend to be most pronounced and aggravated. Thus, at the lower surface, as seen in FIG. 15, the main body 210 is protected against degradation and against the spreading of armor legs 256 (which is the tendency of prior art gaskets such as those shown by FIG. 2) by the presence of the shim sections 260 in the zones of adjacency.

Similarly, the tendency to spread and degradation at the top surface is also resisted at the upper surface where the inner armors 230 and armor shim 232 ensheath and protect the main body 210. That is to be contrasted with prior art structures as illustrated by FIGS. 5 and 6 where spreading of the armor legs will allow gases to enter and gain access to the main body 42 of the gasket at the peripheral edges of the combustion openings 44.

The method of assembling a gasket in accordance with the present invention is illustrated by FIGS. 16–19 in association with FIGS. 7–11.

Figure 16:
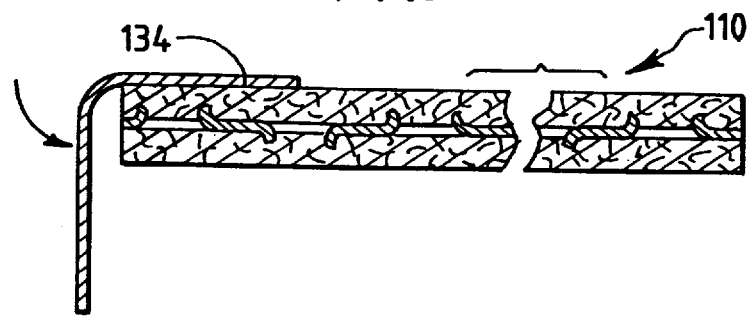
FIGS. 16–19 are representational views of a stepwise method of assembling an armored head gasket in accordance with FIG. 7–11, and are shown at the cross section represented by FIG. 10.

Referring first to FIGS. 16 and 10, a main gasket body 110 is provided. It may be preformed with all of the plurality of service openings and holes, including oil and water openings, combustion openings and bolt holes, and initially comprises the central core, such as the tanged core, and associated facing layers, such as the compressed expanded graphite layer disposed on each main surface. The main gasket body 110 defines a series of combustion openings, adjacent pairs of which define zones of adjacency between them, and a pair of main or major surfaces.

Figure 17:
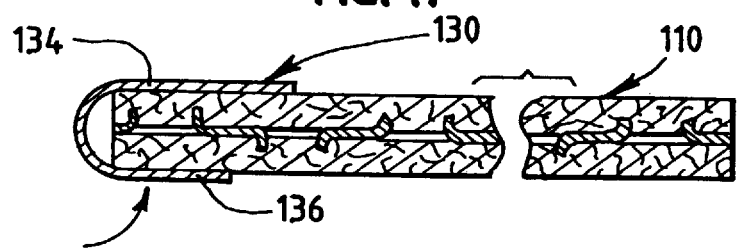

A first integrated inner armor assembly is provided. This includes the plurality of armors 130 and shim portions or shims 132 in the zones of adjacency. Initially each first leg 134 terminates inwardly in an integral extension I which is disposed generally perpendicularly to leg 134. As so configured, the assembly of armors may be juxtaposed with body 110 with legs 134 and shims 132 lying against one main surface, and with extensions I entering and projecting downwardly into the combustion openings 116 closely adjacent to the peripheries of the combustion openings, as represented by FIG. 16. Thereafter, in accordance with known practices, extensions I are formed outwardly to embrace the peripheral edges of the combustion openings and to form second lower legs 136 which underlie the gasket body around the combustion opening and an enclosed nose section, as represented by FIG. 17, all of which form the U-shaped armor configuration illustrated.

Figure 18:
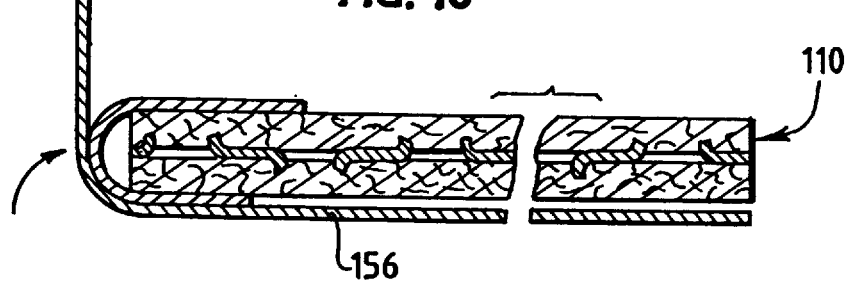
Figure 19:
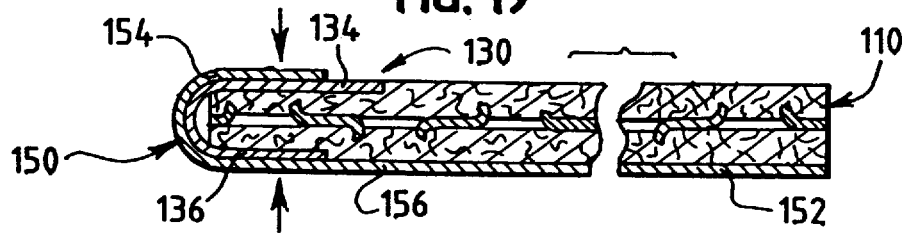

A second integrated outer armor section is provided as well. To that end a plurality of second armors 150 and second shim sections 157 for covering the other main surface in zones of adjacency of adjacent pairs of combustion openings are provided. Initially each first or lower leg 156 terminates inwardly in an integral extension E which is disposed generally perpendicularly to leg 154. As so configured, the assembly of armors 150 may be juxtaposed with body 110 with legs 156 and shim sections 157, as well as the remainder of sheet 152 lying against the other main surface, and with extension E projecting upwardly into the combustion opening in a direction opposite to which the extension I projected, as represented by FIG. 18. Thereafter, extension E is formed outwardly to embrace the peripheral edges of the combustion openings and to form second legs 154 which overlie the gasket body around the combustion opening and an enclosed nose section, as represented by FIG. 19, all of which form the second Ushaped armor configuration shown.

Thus, the zone of adjacency between each adjacent pair of combustion openings is encapsulated, resists degradation due to thermal push, and has improved sealing and load/deflection characteristics.

It will be noted that at times terms such as "underlying", "overlying," "upwardly" and "downwardly" have been used to describe the assembly of the head gasket. This is intended to relate the fact that the armors are applied from opposite sides so that the shim portions cover opposite sides to assist in affecting the encapsulation of the zones of adjacency. Thus, the terms are to be understood in their relational senses, not in their absolute senses.

Only several embodiments of the present invention have been described. It will be apparent to those skilled in the art that modifications may be made without departing from the spirit and scope of the invention. Accordingly, the invention is to be construed in light of the claims and is not to be limited by the specific embodiments described and illustrated.

What is claimed Is:

1. A head gasket comprising:
   a main gasket body having a core and on said core at least one facing layer of one of a compressed expanded graphite layer and a fiber-elastomeric layer and defining a plurality of apertures, said apertures including liquid passageways and at least one pair of adjacent combustion openings, and said main gasket body having first and second main surfaces, a first armor assembly comprising armors and having a joining shim portion covering the zone of adjacency of the pair of adjacent combustion openings on one of said main surfaces, each said armor surrounding and embracing the peripheral edge of a combustion opening and having a first leg formed with said joining shim portion and having a second leg confronting the other of said main surfaces, and a second armor assembly comprising second armors and having a joining shim portion covering the zone of adjacency of the pair of adjacent combustion openings on the other of said main surfaces, each said second armor surrounding and embracing the peripheral edge of a combustion opening and having a first leg confronting the one of said main surfaces, whereby said zone of adjacency is encapsulated and resists degradation due to thermal push, wherein except around the combustion openings where the first and second armors surround and embrace the peripheral edges of the combustion openings, at least one of said main surfaces is not covered by said armor assemblies and said one surface is substantially exposed throughout.

2. The head gasket of claim 1, and wherein said second armor assembly has a main body portion that overlies an entire main surface and defines said second armor assembly joining shim portion.

3. The head gasket of claim 1, and wherein outside of said zone of adjacency said first armor first leg projects radially outwardly beyond said second armor first leg.

4. The head gasket of claim 1, and wherein said main gasket body includes a pair of facing layers, one on each surface of said core.

5. The head gasket of claim 4, and wherein said facing layers are compressed expanded graphite.

6. The head gasket of claim 1, and wherein said armors are U-shaped armors, each having a nose portion formed with legs confronting the main surfaces of said main gasket body.

7. The head gasket of claim 1, and wherein each armor of said second armor assembly has a second leg confronting the other of said main surfaces, and wherein outside of said zone of adjacency said second armor second leg projects radially outwardly beyond said first armor second leg.

8. The head gasket of claim 7, and wherein outside of said zone of adjacency said first armor first leg projects radially outwardly beyond said second armor first leg.

9. A head gasket in accordance with claim 1, and wherein except around the combustion openings where the first and second armors embrace the peripheral edges of the combustion openings, neither of said main surfaces is covered by said armor assemblies and both of said main surfaces are substantially exposed throughout.

* * * * *